United States Patent [19]

Vig

[11] 4,065,211
[45] Dec. 27, 1977

[54] PRECISION X-RAY DIFFRACTION SYSTEM INCORPORATING A LASER ALIGNER

[75] Inventor: John R. Vig, Colts Neck, N.J.

[73] Assignee: The United States of America as represented by the Secretary of the Army, Washington, D.C.

[21] Appl. No.: 662,655

[22] Filed: Mar. 1, 1976

[51] Int. Cl.$^2$ ................ G01B 11/26; G01N 21/00
[52] U.S. Cl. .................... 356/152; 250/272; 356/30; 356/31
[58] Field of Search ........ 250/272, 273, 276, 277 CH; 356/30, 31, 152

[56] References Cited

U.S. PATENT DOCUMENTS 3,448,265  6/1969  Samuelson ..................... 250/272
3,880,524  4/1975  Dill et al. ..................... 356/152

FOREIGN PATENT DOCUMENTS 2,017,604  11/1971  Germany ..................... 250/273

OTHER PUBLICATIONS

Greene et al., J. Phys. E. (Gr. Britain) vol. 5, No. 10, Oct. 1975.

Primary Examiner—S. C. Buczinski
Attorney, Agent, or Firm—Nathan Edelberg; Sheldon Kanars; Daniel Sharp

[57] ABSTRACT

An X-ray diffraction system for crystal analysis employing laser alignment to reduce errors inherent in the mechanical operation of the goniometer apparatus.

3 Claims, 7 Drawing Figures

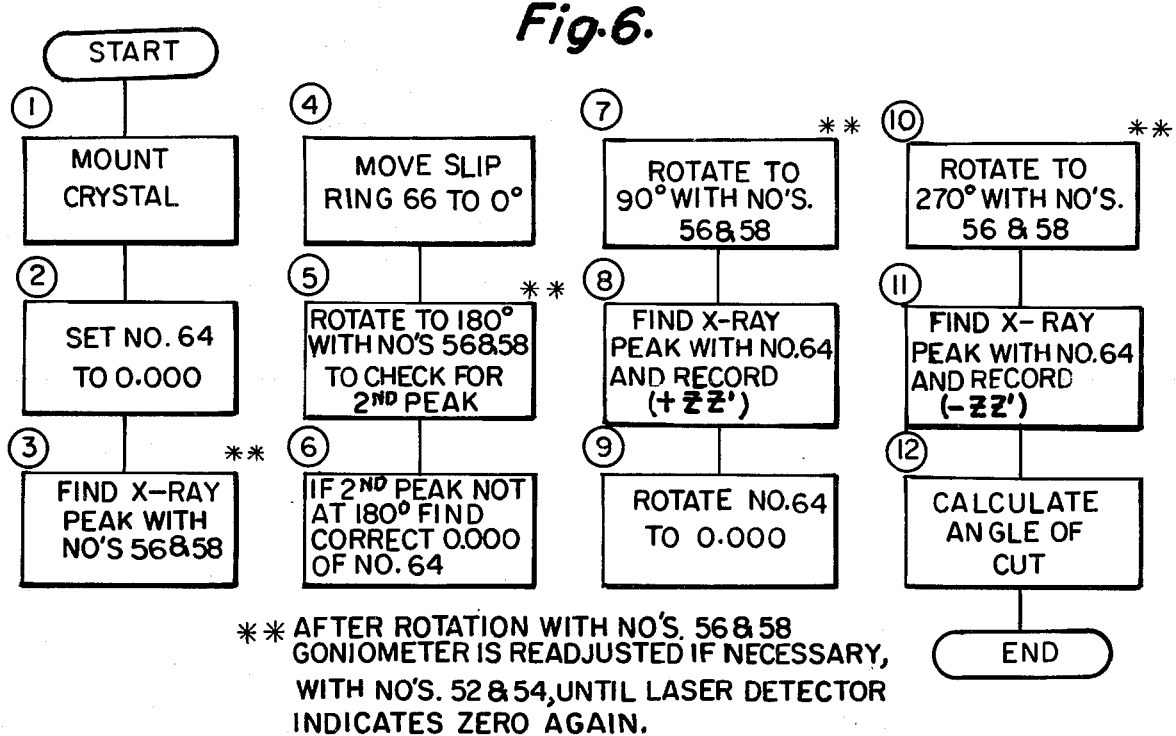
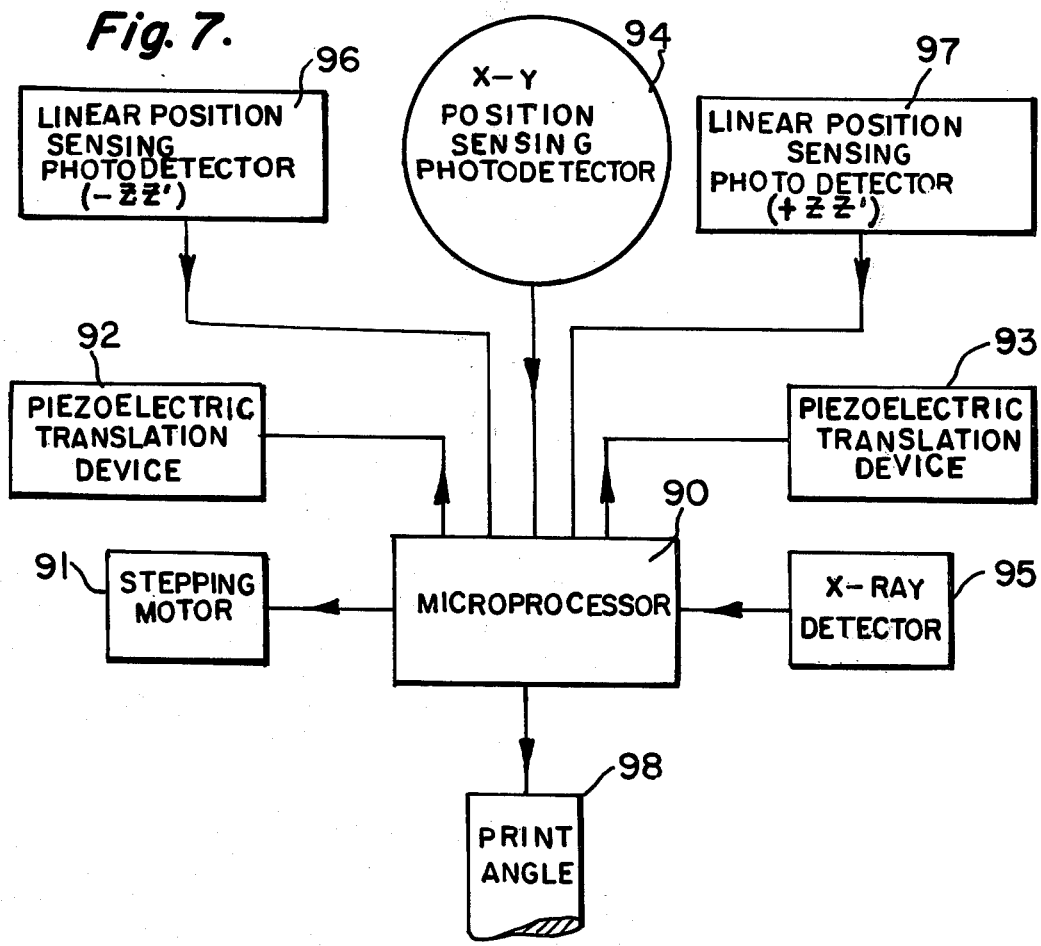

PRECISION X-RAY DIFFRACTION SYSTEM INCORPORATING A LASER ALIGNER

FIELD OF THE INVENTION

This invention relates to X-ray diffraction systems for crystal analysis and, more particularly, to such a system in which the determination of the crystallographic orientation of single crystal plates, such as quartz resonator plates, is significantly improved.

BACKGROUND OF THE INVENTION

As is well known and understood, the frequency-temperature characteristic of quartz crystal resonators depends primarily on the angle of cut of the quartz plate with respect to the natural crystallographic axes. Precision crystal oscillators often require accurate control of the crystal blank's angle of cut to satisfy imposed stability requirements. Where X-ray diffraction techniques are employed as a means of measuring the angle of cut, an accuracy in the order of a few seconds is desirable in order to attain a high manufacturing yield.

As is also known, particular difficulty is encountered in the case of circular crystal plates, where measurement uncertainties of up to one to two minutes of arc have commonly been experienced. Whereas complex X-ray goniometer systems have been suggested to produce an increased accuracy in measurement precision, it has been found that errors continue to persist; and that this, in part, results from the fact that the goniometer generally measures the angle between the atomic plane of the crystal and a reference plane in the goniometer to which the crystal plate is secured, whereas it is the angle between the atomic plane and the plate face which is sought to be measured. Analysis has shown that the atomic plane and the goniometer reference plane may not necessarily be parallel — but, in fact, may be angled, because of imprecise vacuum chuck arrangement, because of dust particles present in the system mounting points, and because pressures may vary inside the vacuum chuck. Additionally, the uncertainty in defining the peak of the X-ray rocking curve, imprecision in the 90° rotations about the plate face normal, and tilt in the plate so that the plate face was not perpendicular to the plane of the goniometer, were other sources of inaccuracy. Some of these sources of error were determined to be inherent, and seemingly unavoidable, in the mechanical operation of the X-ray goniometer.

SUMMARY OF THE INVENTION

As will become clear hereinafter, the X-ray diffraction system of the present invention permits correction of the most significant sources of errors associated with the goniometry of crystal plates by means of a laser alignment system. The X-ray beam and a laser beam are reflected from the same point on the crystal plate, with the reflected laser beam being monitored by position sensing photodetectors of the type which can detect the position of the plate face with accuracies better than 0.5 seconds of arc. If a rotation of the crystal plate changes the position of the reflected laser beam, adjustments of the goniometer controls are made in a direction to offset the tilt in the position of the plate face bringing such laser beam change about. In one arrangement of the invention, a quadrant type of position sensing photodetector is employed, while a continuous position sensing detector is utilized in an alternative arrangement. A feedback network could be incorporated in automating the system, if desired, along with automatically adjustable controls for the goniometer.

BRIEF DESCRIPTION OF THE DRAWINGS

These and other features of the present invention will be more clearly understood from a consideration of the following description, taken in connection with the accompanying drawings, in which:

FIG. 6 is a summarization of the procedures employed in the goniometry of circular plates following the teachings of the present invention; and FIG. 7 is a block diagram of apparatus for automating the procedures of FIG. 6.

DETAILED DESCRIPTION OF THE DRAWINGS

Figure 1:
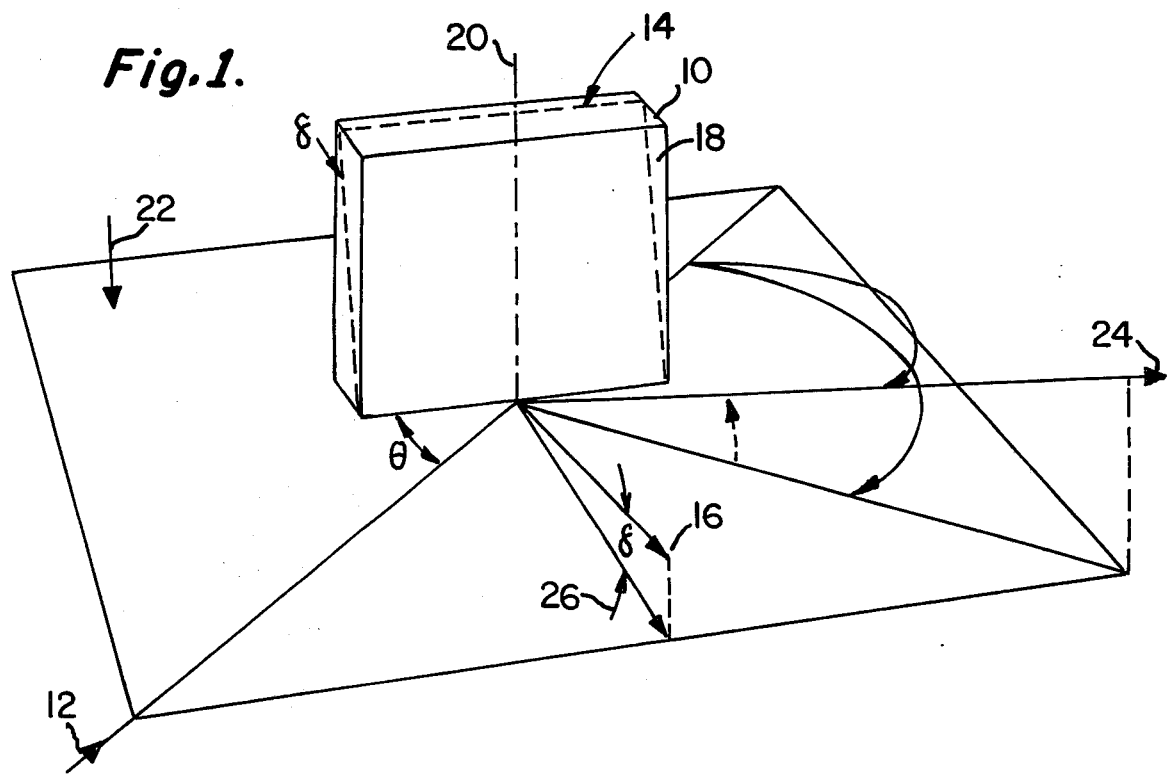
FIGS. 1 and 2 show the reflection of X-ray beams from an AT-cut quartz plate, helpful in an understanding of the invention.

Although the X-ray diffraction system of the invention is useful for providing precise measurements of angle cut for square and rectangular crystals, it is especially attractive in measuring the angle of cut of a circular plate. Generally speaking, the illustration of FIG. 1 is a representation of a crystal blank 10, showing the reflection of an X-ray beam 12 from an AT-cut quartz plate. One of the atomic planes of the crystal 14, defined by the inherent lattice structure of the crystal 10, is also shown, along with a line 16 normal to the atomic plane 14 and extending outwardly through the crystal face 18. The axis of the instrument is represented by the reference notation 20, the plane of the instrument is represented by the notation 22, the reflected X-ray beam is shown by the line 24, and the line 26 represents the normal to the crystal face 18. The angle between the atomic plane 14 and the plate face 18 is represented by $\delta$, while the angle between the incident beam 12 and the plate face 18 is represented by $\theta$. In this case, the atomic plane 14 is assumed to intercept the plate face 18 in a line within the plane of the instrument 22. As is known by those skilled in the art, the "plane of the instrument" 22 is an imaginary plane defined by the incident X-ray beam 12 and the center point of an incorporated X-ray detector.

As is also well known, if the plate face 18 is set at approximately the Bragg angle with respect to the incident X-ray beam 12, then as the crystal blank 10 is rotated about the plate face normal 26 through 360°, there will be two peaks indicated by the X-ray detector. These two peaks will be 180° apart, if and only if, the intersection of the atomic plane 14 and the plate face 18 is in the plane of the instrument 22 when the two peaks occur. When this condition is satisfied, the XX' orientation of the crystal 10 is parallel to the plane of the instrument 22, and the angle between the incident beam 12 and the plate face 18 is given by $$\sin\theta = \frac{\sin\theta_B}{\cos\delta} \qquad (1)$$

where $\theta_B$ is the Bragg angle.

Figure 2:
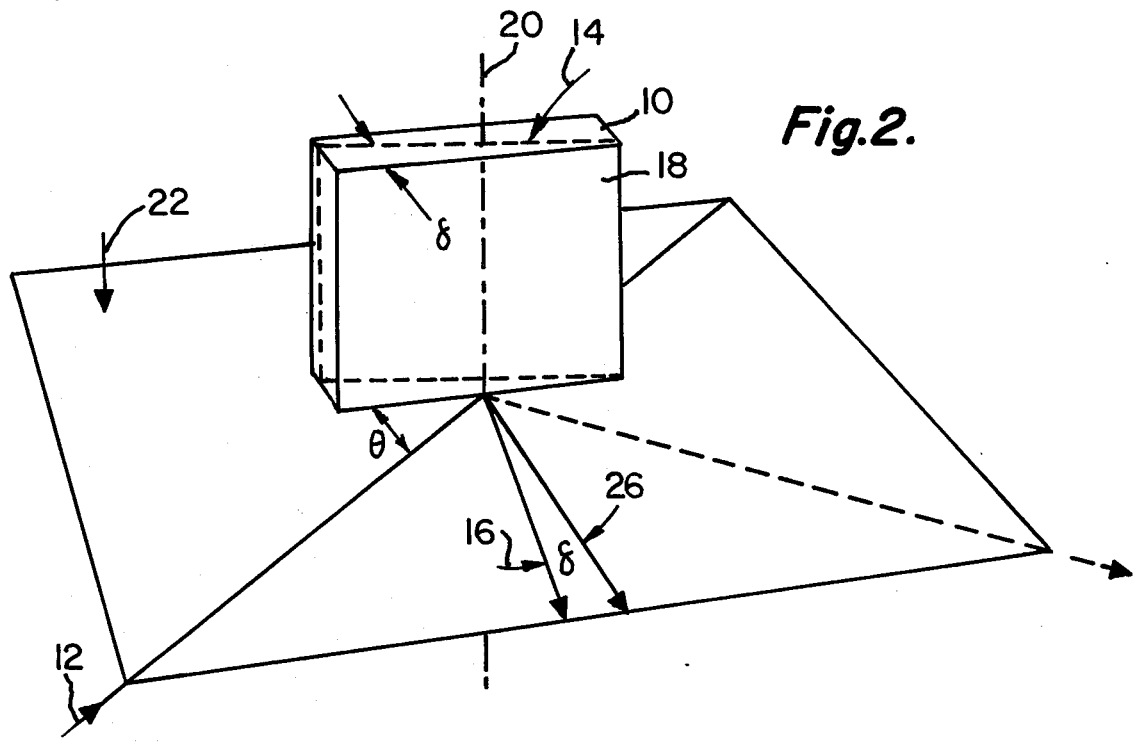

To measure the angle of cut of a circular plate, the following procedure could be used. The goniometer is adjusted so as to place the plate face 18 near the angle $\theta$ with respect to the incident beam 12. The crystal 10 is then rotated about the plate face normal 26 until the X-ray detector indicates a peak. To assure that this orientation is truly the one where the crystal's XX' is parallel to the plane of the instrument 22, the crystal 10 is rotated about the plate face normal 26 until the second peak is found. If the second peak is not 180° away from the first, then the plane of the crystal 10 is adjusted (i.e., the crystal 10 is rotated about the axis of the instrument 20) until the two peaks are 180° apart. The crystal is then rotated about the plate face normal 26 by 90° in either direction. In this position, the ZZ' position, the intersection of the atomic plane 14 and the plate face 18 is perpendicular to the plane of the instrument 22. The angle between the atomic plane 14 and the incident beam 12 is $\theta + \delta$ after a counter-clockwise 90° rotation (the $-ZZ'$ position) and $\theta - \delta$ after a clockwise 90° rotation (the $+ZZ'$ position). To produce an X-ray reflection on either ZZ' position, the crystal 10 must be rotated about the axis of the instrument 20 until the atomic plane 14 is again at the Bragg angle with respect to the incident beam 12. This requires a rotation of $\delta + (\theta - \theta_B)$ for the $-ZZ'$ position, and an opposite rotation of $\delta - (\theta - \theta_B)$ for the $+ZZ'$ position. The sum of the absolute values of these two rotations is $2\delta$, from which the angle of cut can be determined by subtracting $\delta$ from 38°13'. FIG. 2 illustrates the $-ZZ'$ position, after a 90° counter-clockwise rotation of the crystal 10 about the plate face normal 26.

In the goniometry of crystal plates, the object is to very accurately measure the angle $\delta$ between the atomic plane 14 and the plate face 18. However, as conventionally employed, the goniometer apparatus generally measures the angle between the atomic plane 14 and a reference plane in the goniometer to which the plate face 18 is not necessarily parallel. Experience has shown that when a crystal is dismounted and then remounted, the angle between the reference plane in the goniometer and the plate face 18 often changes. Even with a high degree of resolution, this absence of reproducibility casts a large measure of uncertainty on the angle of cut determined.

Testing has shown that several factors can contribute to the errors which arise in the goniometry of circular plates. Specifically, the major error has been found to be due to the fact that, in general, during rotations about the plate face normal 26, the plate face normal does not stay constant, but wobbles. One reason for the wobble results from the difficulty in lapping and maintaining the three points of the vacuum chuck of the goniometer so that the plane defined by the three points is exactly perpendicular to the axis of rotation of the element rotator which rotates the plate 10 about the plate face normal 26. For example, if the three capillaries are spaced 4mm apart, and if one of the three capillaries is too long by the order of a wavelength of light, then the plane defined by the three points will be tilted with respect to the desired plane by about 30 seconds.

Another reason for the wobble has been found to be due to dust—a 1μm diameter particle of dust between the plate 10 and one of the three mounting points could tilt the crystal by about 1 minute of arc. Since, in a cubic meter of a typical factory air, there are of the order of 1 million particles of dust whose diameter is greater than 0.5μm, the dust problem is not negligible. A further reason for the wobble is due to the tolerances associated with the bearings in the device rotating the plate about the plate face normal. The wobble can be observed by, for instance, reflecting a laser beam from the crystal and observing the resultant projection on a distant wall during rotation—the projected beam will, in general, describe some irregular but nearly circular curve, which will usually vary from measurement to measurement.

Other possible sources of error are also present. One potentially large source arises from the fact that the measured angle of cut can vary as the pressure inside the vacuum chuck changes. Experimentation has shown that the measured angle of cut could be changed by as much as 2 minutes just by changing the pressure inside the vacuum chuck from 0.01 to 0.9 atmospheres. At the higher vacuums, the very thin crystal plates were noted to warp, sometimes causing a loss in the X-ray signal, and a large uncertainty in the measurement. Errors in the 90° rotations about the plate face normal, tilt in the plate so that the plate face was not perpendicular to the plane of the instrument, and the uncertainty in defining the peak of the X-ray rocking curve were other lesser sources of error noted.

It is well appreciated that when the X-ray detector of the goniometer apparatus indicates a peak, the position of the atomic plane of the crystal is known very accurately in relationship to the incident X-ray beam. As will now be described, the apparatus of the present invention provides an equally accurate means of directly measuring the position of the plate face 18, so that the measurement accuracy is no longer limited by the inherent inaccuracies associated with the goniometer and its interface with the crystal plate.

Figure 3:
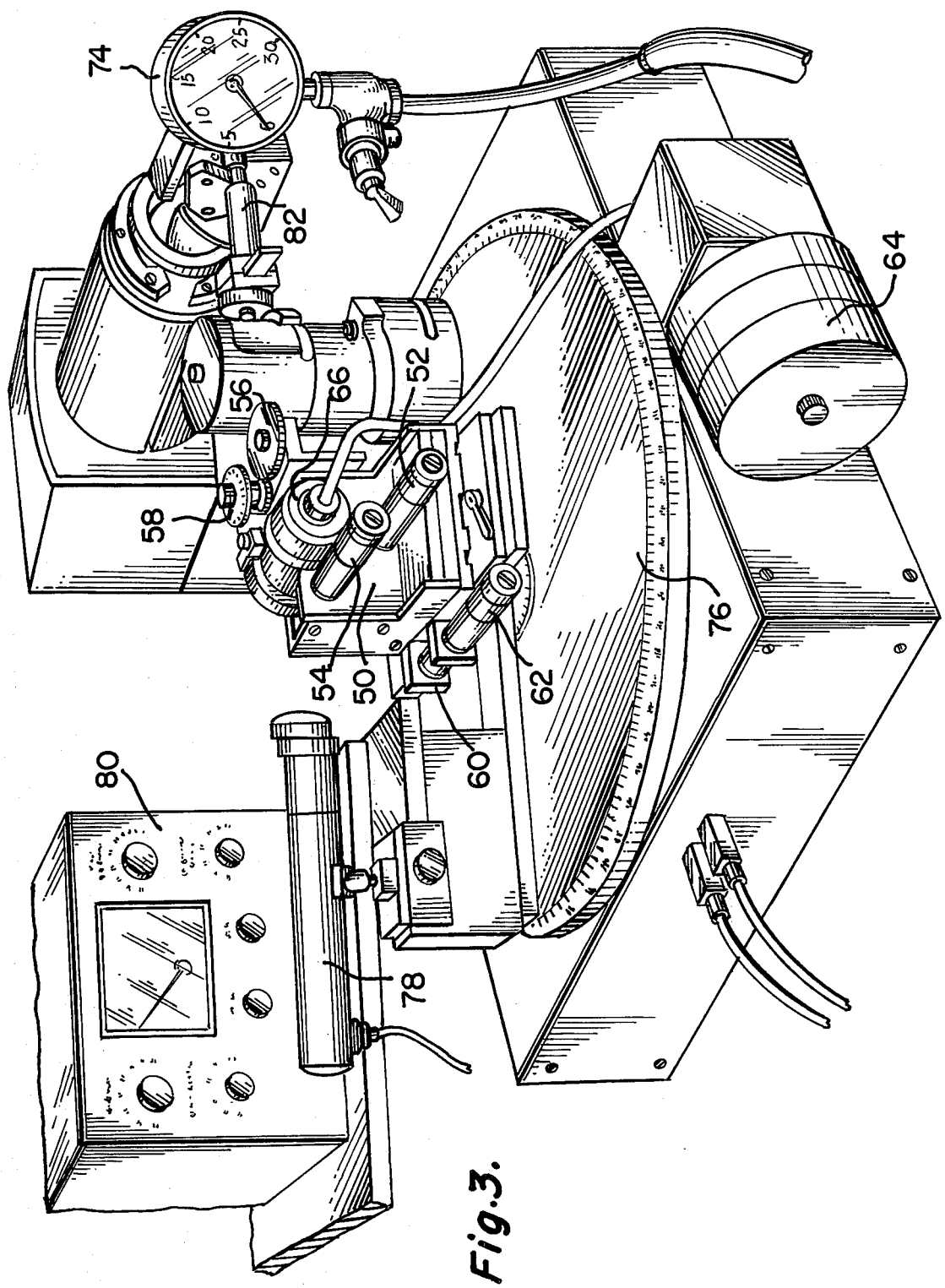
FIGS. 3–5 illustrate apparatus constructed in accordance with the invention.
Figure 4:
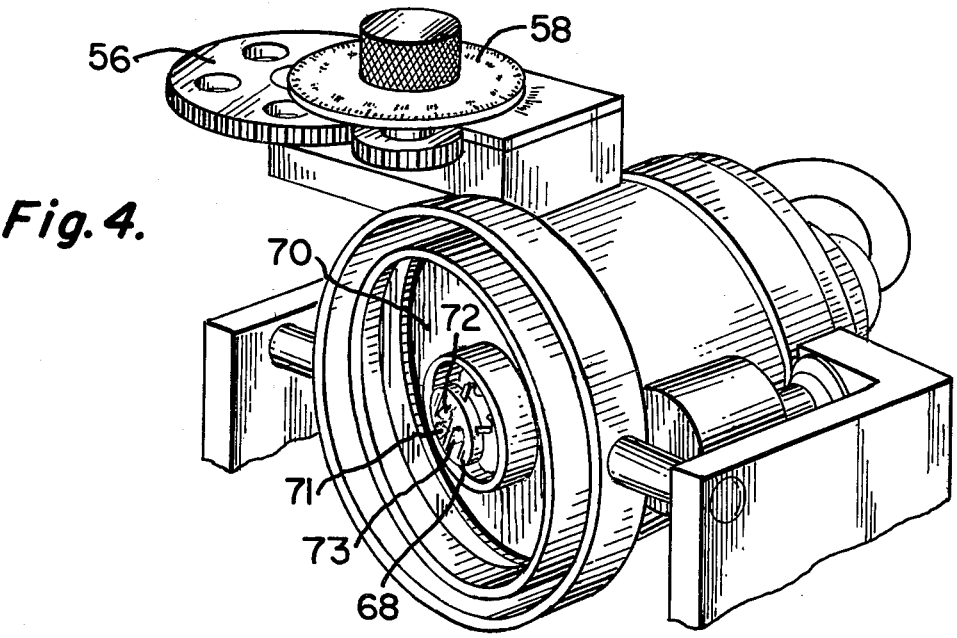
Figure 5:
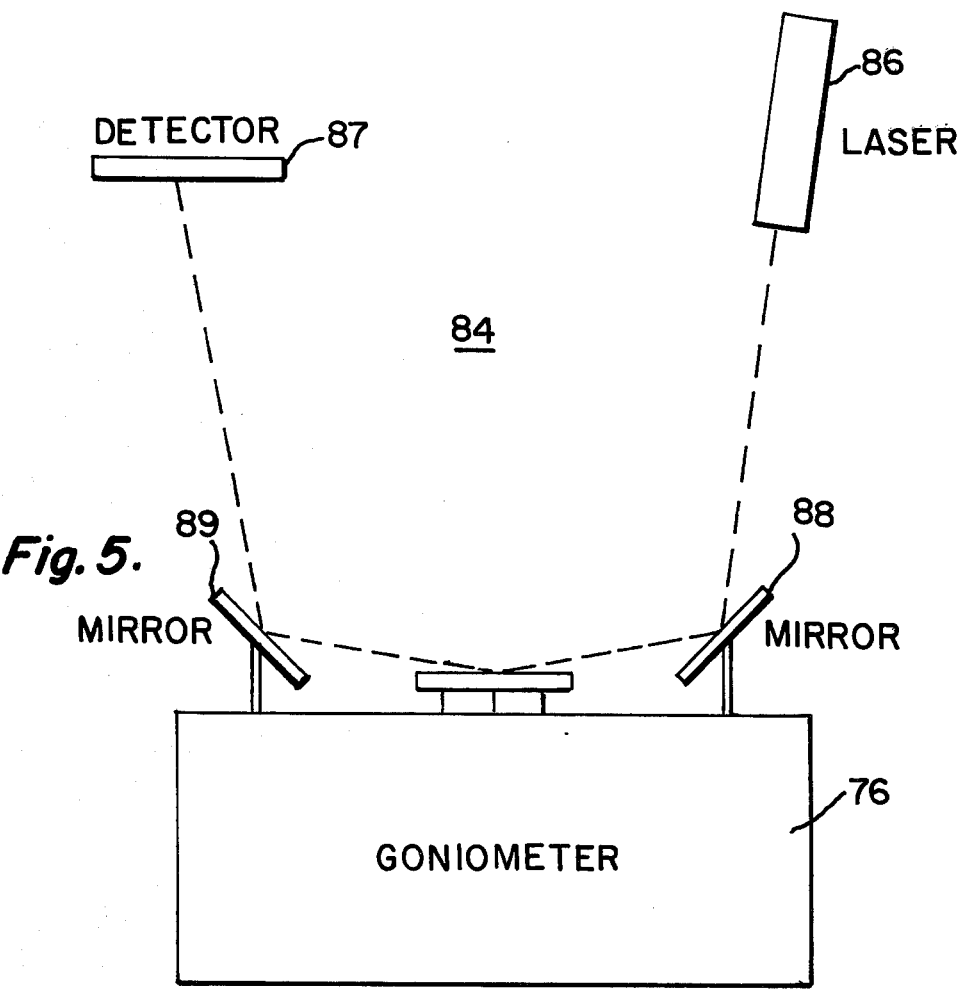

The goniometer apparatus of FIGS. 3-5 comprises an angular orientation device 50, of the type having two gimbal rings independently suspended about vertical and horizontal axes. The gimbal rotations are actuated by differential screw micrometers 52 and 54, which provide angular resolutions of 0.1 seconds. The inner gimbal ring includes an element rotator 70, which rotates the crystal plate about its plate face normal, and is driven by a worm gear. Thumbwheels 56 and 58 provide the coarse and fine adjusts, respectively, for the rotator, with the fine adjust having an angular resolution of 15 seconds. The angular orientation device 50 is attached to a translation stage 60, driven by a third differential screw micrometer 62, which allows the goniometer to be moved forward and backward so as to keep an X-ray beam centered on the front face of the crystal, where crystals of different thicknesses are to be measured. Micrometer 64 rotates the goniometer about the vertical axis of the instrument by ± 5° with a resolution and reproducibility of 1 second of arc. A slip ring 66 is also included, marked with the 0°, 90°, 180° and 270° points of the rotations about the plate face normal.

In one embodiment of the invention, the angular orientation device 50 was a Model 10.253 device of the Lansing Research Corporation of Ithaca, New York, the element rotator was a Lansing Model 11.004 device, and the translation stage 60 was a Lansing Model 20.128 unit. Although primarily used for optics applications, these readily available items have been found particularly suitable for the goniometry of circular plates as herein described.

A vacuum chuck 68 is built into the element rotator 70, and includes three single crystal sapphire capillary tubes 71–73 as mounting points for the quartz crystal. These mounting points are lapped so that the plane defined by the ends is perpendicular to the axis of rotation of the element rotator 70. A pressure gauge 74 monitors the pressure inside the vacuum chuck 68, while the X-ray table 76, (for example, Model 67-1-DCCO of Blake Industries, Inc. of Scotch Plains, New Jersey) carries the micrometer 64 along with it. The X-ray detector 78—either of proportional counter, scintillation, or position sensing type design—may be part of the X-ray table 76, and is connected to a Baird-Atomic RateMeter Model 435, to provide a visual output of the X-ray detector 78. In one arrangement of the invention, a proportional type counter was utilized, along with an audio detection scheme which provided an audible output of varying amplitude and frequency consonant with changes in the detected strengths indicated by the meter 80. In this configuration, X-ray beams from a source were directed, as by 82, by means of slits and a reflection from a monochromator crystal to impinge on the face of the crystal held against the capillary points.

In accordance with the present invention, there is additionally provided a laser alignment system 84 (FIG. 5), schematically incorporating a He-Ne laser 86, or other source of collimated light, a beam deflection arrangement including mirrors 88 and 89 to direct the laser beam at the center of a crystal supported by the vacuum chuck 68, and a photodetector 87 of the quadrant detecting or continuous position sensing detecting type. It will be appreciated that if the beam from laser 86 is reflected from the crystal under analysis, and the position of the reflected beam is observed by the detector 87, then any tilt in the position of the plate face of the crystal because of wobble will be indicated by a change in the position of the reflected beam. It will also be apparent that the incorporation of the mirrors 88 and 89 follow because of the space limitations on the goniometer table 76 supporting the various equipments illustrated in FIGS. 3 and 4. In the actual setup as constructed, it will be understood that the X-ray source 82 and the laser 86 are to be so aligned that both the laser beam and the X-ray beam are directed at the center of the same face of the crystal plate. By directing the laser beam at the center of the crystal plate at a grazing angle of incidence, one can obtain strong, well defined reflections even when the plate is unpolished. If the plate is polished, reflection at a grazing angle has the advantage of minimizing second surface reflections, which if present could introduce an error in measurement.

Before proceeding with a discussion of the operation of the invention, it will be understood that micrometer 52 cooperates with one gimbal ring of the angular orientation device 50 to rotate the crystal held about a horizontal axis, tilting the plane of the crystal back and forth. Micrometer 54, similarly, cooperates with the second gimbal ring to rotate the crystal about a vertical axis. Micrometer 62 adjusts the apparatus for use with crystals of different thicknesses by moving the goniometer back and forth to insure that the front surface of the crystal remains in substantially fixed relationship with respect to the impinging X-ray beam, regardless of the thickness of the crystal. Thumbwheel 56, at the same time, is a coarse adjustment, which rotates the element rotator about the plate face normal of the crystal. The fine adjust thumbwheel 58 provides a 3° rotation for every 360° rotation of the thumbwheel, and is thus more cumbersome to use to provide the necessary 90° rotation of the crystal than with the thumbwheel 56. Micrometer 64 provides a rotation of the crystal about the vertical axis of the instrument — just as with micrometer 54. Micrometer 54 thus serves as a zero adjust for micrometer 64. Micrometer 64 is used to measure the $\delta \pm (\theta - \theta_B)$ rotations, and is thus used to measure the angle of cut $\delta$, as is described previously.

In operating the apparatus of FIGS. 3-5 to measure the angle $\delta$, the crystal is first mounted on the capillary tubes 71-73 so that X-ray beams from the source strike the center of the crystal. The laser, or collimated light, beam is then directed at the crystal so as to impinge on it at the same point. With micrometer number 64 set to zero, micrometer 52 and 54 are adjusted until the laser detector 92 indicates a null reading. Micrometer 52, in this respect, centers the beam in a vertical direction on the crystal while micrometer 54 centers the beam horizontally. Experimentation has shown that if thumbwheel 56 were then rotated, thereby rotating the crystal 10 about the plate face normal 26, an output would be produced from the laser detector indicating that the rotation about the plate face normal was not perfect. The existence of this wobble, although too small to be observed with the naked eye, accounts for most of the inaccuracies previously encountered with determining the angle of cut.

The next step in the procedure is to adjust thumbwheel 56 until the X-ray detector 78 provides a peak output. This coarse adjustment, towards locating the XX' position of FIG. 1, is then followed by a fine adjustment with thumbwheel 58 to determine the precise X-ray peak. After this, micrometers 52 and 54 are adjusted, if need be, to again produce a null output from the laser detector 87. Slip ring 66 is moved to the 0° marking at this point.

To insure that the crystal is in the XX' position, thumbwheel 56 is then rotated until the 180° marker on slip ring 66 is in alignment. A second X-ray peak should be detected at this time, with the fine tuning by thumbwheel 58 again followed by adjustments of micrometers 52 and 54 until the laser detector 87 indicates a null output. This assures the correct XX' position, but if a second peak were not obtained through the 180° rotation via thumbwheels 56 and 58, the reference plane and the photodetector would then be adjusted as described below. The use of the laser aligner to compensate for any wobble in the rotation will be seen to be repeated after other thumbwheel 56, 58 adjustments, as well.

More specifically, after rotating thumbwheels 56 and 58 to bring the 90° marker on slip ring 66 into alignment, micrometers 52 and 54 are again adjusted to bring the crystal plane back to the intial reference, by means of nulling the laser detector output. Micrometer 64 is then adjusted to rotate the entire crystal about the vertical axis of the instrument 20 to obtain an X-ray peak. The reading of micrometer 64 is recorded at that time.

Micrometer 64 is then adjusted back to zero, and thumbwheels 56 and 58 are rotated to bring the 270° marker on slip ring 66 into alignment. Micrometers 52 and 54 are, once again, adjusted to bring the laser beam into the center of the laser detector, and micrometer 64 is rotated in an opposite direction to obtain an X-ray peak. The reading on micrometer 64 when the X-ray peak is detected is then averaged with the previous reading of micrometer 64 and multiplied by a conversion factor, to be converted to degrees, minutes, and seconds. With one crystal measured in this manner, the micrometer 64 readings approximated the number 5675, which when multiplied by a calibration factor of 1.875 for the particular micrometer employed, yielded an angle between the atomic plane and plate face of 2°57'21", or an angle of cut of 35°15'39". With the procedures as herein described, measurements accurate to better than 2 seconds can be made.

It will thus be seen that every time an X-ray peak is to be located with 56 and 58, there is first preceding it a readjustment of micrometers 52 and 54 to insure that the crystal is back in the original reference plane. These procedures are illustrated in FIG. 6, with the understanding that after each rotation about the plate face normal 26 by thumbwheels 56 and 58, the plane of the plate 10 is readjusted by the differential screw micrometers 52 and 54 so as to compensate for any wobble in the axis of rotation and so that the plate face 18 can be maintained in the desired reference plane with very high accuracy.

As was previously mentioned, a second X-ray peak may not be located after the thumbwheels 56 and 58 rotate the crystal by 180°. After thumbwheel 58 is rotated to locate this second peak, the angle between the new position and the 180° position on the slip ring 66 is measured with thumbwheel 58 and the crystal plate 10 is rotated to the half way point between the two positions. The slip ring 66 is moved to mark this midway position as a new 180° position, and the crystal plate 10 is rotated about the vertical axis with micrometer 54 until the X-ray peak is again observed. As micrometers 54 and 64 produce the same rotation, micrometer 64 can be left at the zero position throughout this sub-routine. The photodetector 87 is then reset to a new null location to mark this new position as the correct reference plane. When the crystal 10 is in this new plane, therefore, rotation about the plate face normal 26 will result in the two peaks then being 180° apart.

The manual measurement procedures described in connection with FIG. 6 take between 3 and 5 minutes to perform; it thus becomes a tedious task when repeated over and over for a large number of crystals. Automation of this procedure, therefore, is highly desirable, and can be straightforwardly accomplished.

For example, micrometer 52 may be replaced by a piezoelectric translation device 92 which operated with a feedback network connected to the output of the laser detector to adjust device position as output voltages change. Similarly, micrometers 54 and 64 can be replaced by a second piezoelectric translation device 93 to adjust positions by rotating the gimbal supporting the crystal. Such translation devices may be of the PZ-500 Inchworm type manufactured by Burleigh Instruments, Inc., of East Rochester, New York. (Alternatively, the motions of micrometers 52, 54, and 64 could be automated by attaching motors to them.)

The thumbwheels 56 and 58 which drive the element rotator may be replaced with a standard 15° stepping motor (or alternatively, with a synchroresolver or motor-encoder combination). Both the stepping motor and the piezoelectric translation devices would operate in conjunction with a sequence programmer for digital control. This is indicated by the microprocessor 90 of FIG. 7, with the stepping motor and two piezoelectric translation devices represented by the notations 91–93, respectively. An X-Y position sensing photodetector 94 is included as the previously employed laser detector, programmed into the microprocessor 90 along with the X-ray detector 95 and linear position sensing photodetectors 96 and 97. Piezoelectric translation devices 92 and 93 are controlled by the feedback signal from the X-Y position sensing photodetector 94 so as to maintain the crystal in the desired reference plane, continuously during rotations about the plate face normal by stepping motor 91. After it has been verified that the crystal is in the proper XX' position, the crystal is rotated by stepping motor 91, by a small angle towards the 90° position, until the X-ray signal decreases. The feedback circuit is then disengaged, the X-ray signal is re-peaked by rotation with piezoelectric translation device 93, the direction of movement required of 93 to bring about this repeaking is stored in the microprocessor memory, and the feedback circuit is re-engaged so as to return piezoelectric translation device 93 to its original position. The crystal is then rotated to the 90° position with stepping motor 91, the feedback circuit is disengaged, and the crystal is rotated by piezoelectric translation device 93 in the direction stored until the X-ray detector indicates a peak. At this position, the laser beam reflected from the crystal impinges on one of the linear position sensing photodetectors. The linear position sensing photodetector's output signal indicates the angle through which the crystal has been rotated from the reference plane. (The linear position sensing photodetector had been calibrated during the initial setup of the system and the calibration information, i.e., output signal vs. angle, is stored in the microprocessor memory.)

To accurately define the angle at which the X-ray peak occurs, the output of the X-ray detector vs. the output of the linear position sensing photodetector is recorded in the microprocessor memory for several angles in the vicinity of the peak. The microprocessor then processes this information and determines the plus (or minus) ZZ' angle by curve fitting. The microprocessor then instructs the piezoelectric translation device to rotate the crystal back to the reference plane, and the procedure is repeated as in steps 9 to 12 of FIG. 6, to determine the second ZZ' angle. From the two ZZ' angles, the microprocessor calculates the angle of cut, which is then printed via print unit 98. The difference between the two ZZ' angles can serve as a convenient check on the proper operation of the system, and is therefore also calculated and printed out.

(Whether the steps of FIG. 6 are carried out manually or automatically, it has been found desirable to operate with a pressure just below atmospheric in the vacuum chuck. Better operation has been found where the pressure is only sufficient to hold the crystal in place, as increasing pressures could tend to cause the crystal plate to warp.)

While the discussion has been aimed at measuring the angle of cut of singly rotated cuts of quartz, the method can be extended to the accurate determination of the angle of cut of crystals of general rotation. Also, while there have been described what are considered to be preferred embodiments of the present invention, it will be readily apparent to those skilled in the art that modifications may be made without departing from the scope of the teachings herein of using a laser, or collimated light, beam and detector in the measurement of the angle of cut between the atomic plane and the plate face of a crystal so as to make the measurement independent of mechanical problems inherent within the goniometer. Without such added alignment system, error could be produced after each rotation about the plate face normal of the crystal because of the wobble which would be present as the result of goniometer imprecision, thereby leading to a measured angle of cut which would not be accurate. Any imperfections in the goniometer will be seen to be compensated by the laser alignment system, because in the analysis, the same front surface of the crystal is always being interrogated by the impinging X-ray beam. For at least these reasons, the scope of the invention should be determined from an analysis of the claims appended hereto.

I claim:

1. A method by which the angle between an atomic plane of a crystal plate and the face of the crystal plate can be determined by means of a goniometer instrument including an X-ray detector arranged to receive that portion of an incident X-ray beam reflected from said crystal plate, said crystal plate being mounted for independent rotation about three mutually perpendicular axes, a first axis being normal to the instrument plane defined by said X-ray beam and the center of said X-ray detector, a second axis being normal to the crystal plate face, and a third axis perpendicular to said first and second axes, comprising the steps of:

a. directing a collimated optical beam onto the crystal plate face for reflection therefrom onto a position sensing photodetector;
   b. sequentially and controllably adjusting the rotation of said crystal plate about said first and second axes to discrete controlled positions at each of which a peak reading of the X-ray detector is obtained; and
   c. adjusting the rotation of said crystal plate about said first and third axes after each of the adjustments about said second axis to obtain a null reading of said photodetector indicating correction of any wobble of said second axis introduced during step (b).

2. The method of claim 1 wherein the crystal plate is initially mounted with the angle between the crystal plate face and the incident X-ray beam near the Bragg angle and with the crystal plate face substantially normal to the instrument plane and wherein step (b) of claim 1 includes the steps of $b_1$. rotating the crystal plate about said second axis to the two distinct positions at which the angle between the atomic plane of the crystal plate and the incident X-ray beam is at the Bragg angle as evidenced by X-ray detector peak readings;
   $b_2$. rotating the crystal plate about said first axis until the two positions of step ($b_1$) are substantially 180° apart;
   $b_3$. rotating the crystal plate about said second axis by 90° in either direction from one only of the positions established at step ($b_1$) and adjusting the rotation of the crystal plate about said first axis until a peak reading of the X-ray detector is attained;
   $b_4$. rotating the crystal plate about said first axis to the position attained in step ($b_2$); and
   $b_5$. rotating the crystal plate about said second axis by 180° from the position at step ($b_3$) and adjusting the rotation of the crystal plate about said first axis until a peak reading of the X-ray detector is attained.

3. The method of claim 2 wherein the angle of said rotation about said first axis in steps ($b_3$) and ($b_5$) of claim 2 is measured separately, from which the angle between the atomic plane and the plate face of the crystal can be taken as the average of said two measurements.

* * * * *